US011960223B2

United States Patent

(12) United States Patent
Yoshitsugu et al.

(10) Patent No.: US 11,960,223 B2
(45) Date of Patent: Apr. 16, 2024

(54) IMAGE FORMING APPARATUS HAVING FIXATION UNIT AND DUCTS FOR COOLING

(71) Applicant: FUJIFILM Business Innovation Corp., Tokyo (JP)

(72) Inventors: Koji Yoshitsugu, Kanagawa (JP); Kazunari Ishii, Kanagawa (JP); Yuta Shimatate, Kanagawa (JP); Shunsuke Yamasaki, Kanagawa (JP); Naoki Sambe, Kanagawa (JP); Yasuhisa Gonda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/939,907

(22) Filed: Sep. 7, 2022

(65) Prior Publication Data

US 2023/0305454 A1 Sep. 28, 2023

(30) Foreign Application Priority Data

Mar. 23, 2022 (JP) ................................ 2022-047268

(51) Int. Cl.
*G03G 15/20* (2006.01)
*G03G 21/16* (2006.01)
*G03G 21/20* (2006.01)

(52) U.S. Cl.
CPC ..... *G03G 15/2017* (2013.01); *G03G 21/1685* (2013.01); *G03G 21/206* (2013.01); *G03G 15/2021* (2013.01); *G03G 2221/1639* (2013.01); *G03G 2221/1645* (2013.01)

(58) Field of Classification Search
CPC ........... G03G 15/2021; G03G 15/2017; G03G 21/1685; G03G 21/1639; G03G 21/206; G03G 2221/1645
USPC ..................................................... 399/92, 122
See application file for complete search history.

(56) References Cited

U.S. PATENT DOCUMENTS 5,166,727 A * 11/1992 Miyamoto ............. G03G 21/12 165/47
2008/0219693 A1* 9/2008 Kondo ................. G03G 21/206 399/92
2012/0315061 A1* 12/2012 Kondo ............... G03G 15/2017 399/92
2014/0161481 A1* 6/2014 Udagawa ............ G03G 21/206 399/92
2015/0098723 A1* 4/2015 Mitorida ............. G03G 21/206 399/92

(Continued)

FOREIGN PATENT DOCUMENTS

JP 2008250284 10/2008
JP 2009014895 A * 1/2009 ........... G03G 21/206

*Primary Examiner* — Robert B Beatty
(74) *Attorney, Agent, or Firm* — JCIPRNET

(57) ABSTRACT

An image forming apparatus includes an apparatus main body that includes an image formation unit forming an image on a recording material, a fixation unit that includes a fixing unit fixing the image formed by the image formation unit onto the recording material and that is attachable to and detachable from the apparatus main body, a first duct that is attached to the fixation unit to face the fixing unit and through which a gas that cools the fixing unit flows, and a second duct that is attached to the apparatus main body to be adjacent to the first duct and through which a gas that cools the fixing unit flows.

11 Claims, 9 Drawing Sheets

(56) References Cited

U.S. PATENT DOCUMENTS

| | | | | | |
|---|---|---|---|---|---|
| 2015/0268600 | A1* | 9/2015 | Umeno | ............. | G03G 15/2017<br>399/92 |
| 2019/0332053 | A1* | 10/2019 | Kawasumi | ........... | G03G 21/206 |

* cited by examiner

IMAGE FORMING APPARATUS HAVING FIXATION UNIT AND DUCTS FOR COOLING

CROSS-REFERENCE TO RELATED APPLICATIONS

This application is based on and claims priority under 35 USC 119 from Japanese Patent Application No. 2022-047268 filed Mar. 23, 2022.

BACKGROUND

(i) Technical Field

The present invention relates to an image forming apparatus.

(ii) Related Art

Disclosed in JP2008-250284A is a technique in which a ventilation duct is provided in a space between an image forming unit and a fixation unit and an intake duct and an exhaust duct are connected to a side surface on a side opposite to a paper transport path of the ventilation duct so that the amount of air passing through the ventilation duct and the cooling efficiency of the image forming unit is improved.

SUMMARY

As a method of improving cooling efficiency for a fixing unit provided in a fixation unit that can be attached to and detached from an apparatus main body, it is conceivable to provide a plurality of ducts for the fixation unit. However, in a case where the fixation unit is provided with a plurality of ducts, the visibility of a recording material at the fixing unit is likely to decrease in a case where the fixation unit is drawn out from the apparatus main body because of clogging of the recording material in the fixing unit, for example.

Aspects of non-limiting embodiments of the present disclosure relate to an image forming apparatus that suppresses a decrease in visibility caused in a case where a fixing unit is drawn out from an apparatus main body while maintaining cooling efficiency for the fixing unit in comparison with a case where a fixation unit that can be attached to and detached from the apparatus main body is provided with a plurality of ducts.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including an apparatus main body that includes an image formation unit forming an image on a recording material, a fixation unit that includes a fixing unit fixing the image formed by the image formation unit onto the recording material and that is attachable to and detachable from the apparatus main body, a first duct that is attached to the fixation unit to face the fixing unit and through which a gas that cools the fixing unit flows, and a second duct that is attached to the apparatus main body to be adjacent to the first duct and through which a gas that cools the fixing unit flows.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the accompanying drawings.

Figure 1:
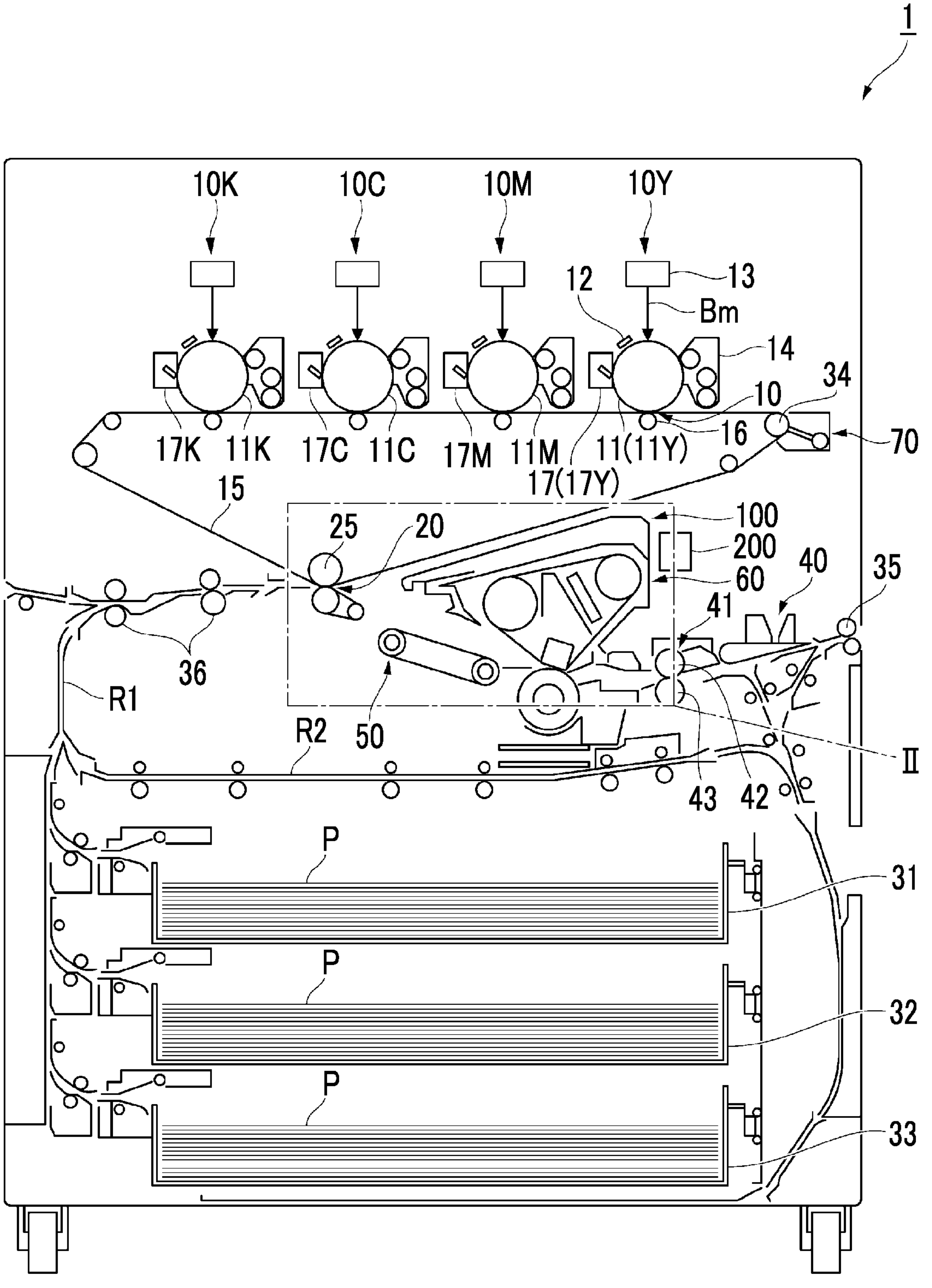
FIG. 1 is a schematic configuration view showing an image forming apparatus to which the present exemplary embodiment is applied.
Figure 2:
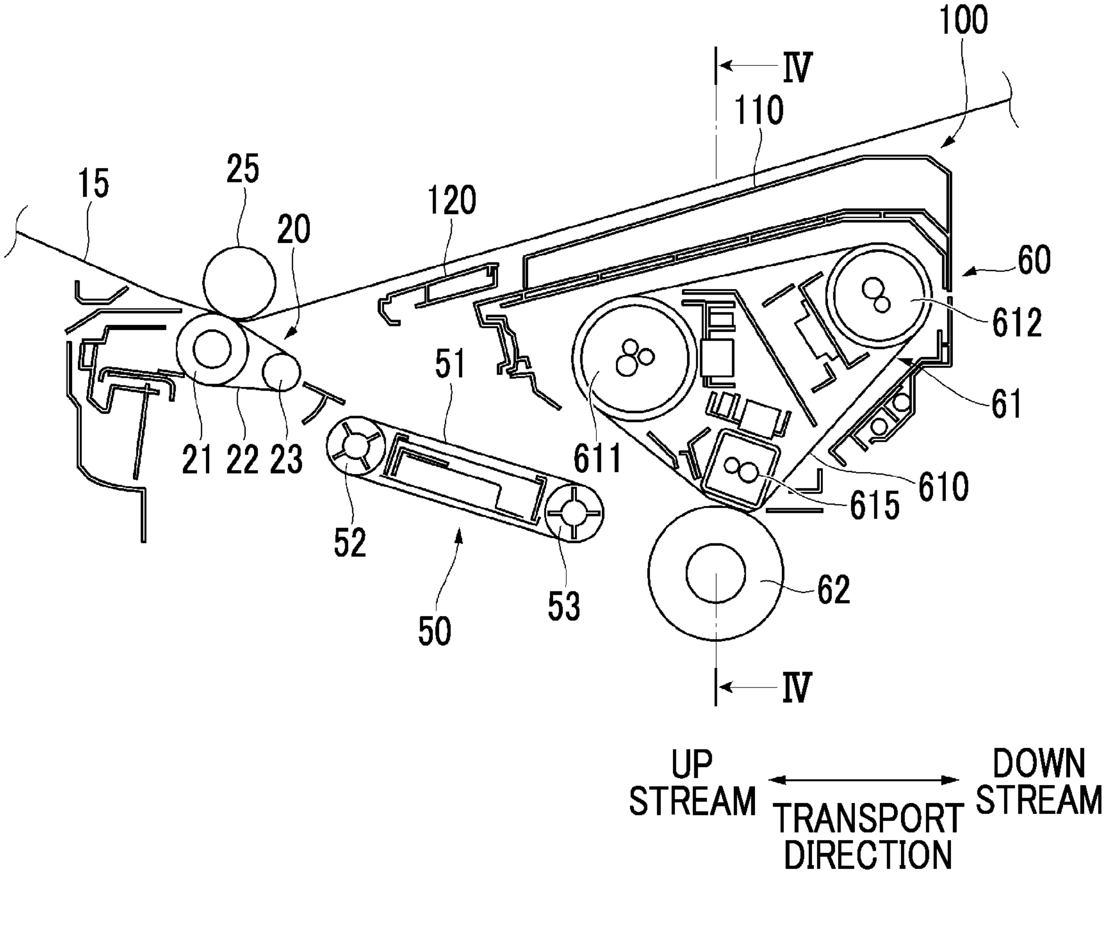
FIG. 2 is an enlarged view of part II in the image forming apparatus shown in FIG. 1.

FIG. 1 is a schematic configuration view showing an image forming apparatus 1 to which the present exemplary embodiment is applied. FIG. 2 is an enlarged view of part II in the image forming apparatus 1 shown in FIG. 1.

The image forming apparatus 1 shown in FIG. 1 is an intermediate transfer type image forming apparatus that is generally called a tandem type. The image forming apparatus 1 is provided with a plurality of image forming units 10Y, 10M, 10C, and 10K in which toner images of respective color components are formed through electrophotography.

The image forming units 10Y, 10M, 10C, and 10K form yellow (Y), magenta (M), cyan (C), and black (K) (hereinafter, these colors may be referred to as normal colors) images, respectively.

In addition, the image forming apparatus 1 is provided with a primary transfer unit 10 that primary-transfers, to an intermediate transfer belt 15, toner images of respective color components formed by the image forming units 10Y, 10M, 10C, and 10K in order. Furthermore, the image forming apparatus 1 is provided with a secondary transfer unit 20, which is an example of an image formation unit that collectively secondary-transfers, to paper P which is an example of a recording material, superimposed toner images transferred onto the intermediate transfer belt 15.

Each of the image forming units 10Y, 10M, 10C, and 10K is provided with electrophotographic devices as follows. First, a charger 12 that charges a photoreceptor drum 11, which rotates in a clockwise direction in FIG. 1, is provided in the vicinity of the photoreceptor drum 11. In addition, a laser exposure device 13 that writes an electrostatic latent image on the photoreceptor drum 11 is provided. An exposure beam from the laser exposure device 13 is denoted by a reference numeral "Bm" in FIG. 1. Note that, in the following description, the photoreceptor drums 11 provided in the image forming units 10Y, 10M, 10C, and 10K may be referred to as photoreceptor drums 11Y, 11M, 11C, and 11K.

Furthermore, a developing device 14 that accommodates a developing agent containing a carrier and toner and that visualizes the electrostatic latent image on the photoreceptor drum 11 by means of the toner is provided. In addition, a primary transfer roller 16 that transfers a toner image of each color formed on the photoreceptor drum 11 to the intermediate transfer belt 15 at the primary transfer unit 10 is provided. In addition, a drum cleaner 17 that removes toner remaining on the photoreceptor drum 11 is provided. The drum cleaner 17 is composed of, for example, a cleaning blade that comes into contact with a surface of the photoreceptor drum 11 and that scrapes off toner remaining on the surface of the photoreceptor drum 11. Note that, in the following description, the drum cleaners 17 provided in the image forming units 10Y, 10M, 10C, and 10K may be referred to as drum cleaners 17Y, 17M, 17C, and 17K.

A drive roller 34 driven by a motor (not shown) causes the intermediate transfer belt 15 to circulate and move at a predetermined speed in a counterclockwise direction in FIG. 1. The primary transfer unit 10 is configured to include the primary transfer rollers 16 that are disposed to face the photoreceptor drums 11 with the intermediate transfer belt 15 interposed therebetween. In addition, toner images on the respective photoreceptor drums 11 are electrostatically attracted onto the intermediate transfer belt 15 in order so that superimposed toner images are formed on the intermediate transfer belt 15.

The secondary transfer unit 20 includes a secondary transfer roller 21, a belt member 22, and a support roller 23 disposed on an outer periphery (toner image holding surface side) of the intermediate transfer belt 15. In addition, the secondary transfer unit 20 includes a backup roller 25 disposed on an inner periphery of the intermediate transfer belt 15. In the secondary transfer unit 20, the belt member 22 is supported by being wound around the outer peripheries of the secondary transfer roller 21 and the support roller 23. In addition, in the secondary transfer unit 20, an outer peripheral surface of the intermediate transfer belt 15 and an outer peripheral surface of the belt member 22 are disposed to be brought into contact with each other. Furthermore, in the secondary transfer unit 20, the secondary transfer roller 21 is disposed to press the backup roller 25 with the belt member 22 and the intermediate transfer belt 15 interposed therebetween. In addition, the secondary transfer roller 21 is grounded, a secondary transfer bias is formed between the secondary transfer roller 21 and the backup roller 25, and a toner image formed on the intermediate transfer belt 15 is secondary-transferred into the paper P transported to the secondary transfer unit 20.

In addition, the image forming apparatus 1 is provided with a fixing device 60 which is an example of a fixing unit that fixes the secondary-transferred toner image onto the paper P.

The fixing device 60 includes a fixation belt module 61 and a pressure roller 62 that is pressed against the fixation belt module 61. In the fixing device 60, a toner image is fixed onto the paper P with the paper P pressed and heated at a position (fixation nip portion) where the fixation belt module 61 and the pressure roller 62 come into contact with each other.

The fixation belt module 61 includes an endless fixation belt 610 and support rollers 611 and 612 that are rotatably provided and that support the fixation belt 610 from inside. The support roller 611 receives a driving force from a drive source (not shown) and rotates in a clockwise direction in the drawings. Then, as the support roller 611 rotates, the fixation belt 610 receives the driving force from the support roller 611 and travels around in the clockwise direction in the drawings.

In addition, the fixation belt module 61 includes a load receiving member 615 that receives a load from the pressure roller 62 at a position at which the load receiving member 615 faces the pressure roller 62 with the fixation belt 610 interposed therebetween. In the fixing device 60 of the present exemplary embodiment, the paper P is sandwiched by both of the pressure roller 62 and the load receiving member 615 so that a pressure is applied to the paper P.

Furthermore, the fixation belt module 61 is provided with heaters (not shown) that are provided inside the support rollers 611 and 612 and the load receiving member 615 and that heat the support rollers 611 and 612 and the load receiving member 615.

In addition, the image forming apparatus 1 includes a transport unit 50 that transports the paper P, on which the toner image has been secondary-transferred by the secondary transfer unit 20, toward the fixing device 60.

The transport unit 50 includes an endless transport belt 51 and support rollers 52 and 53 that are rotatably provided and that support the transport belt 51 from inside. The support roller 52 receives a driving force from a driving source (not shown) and rotates in a clockwise direction in the drawings. Then, as the support roller 52 rotates, the transport belt 51 receives the driving force from the support roller 52 and travels around in the clockwise direction in the drawings.

In addition, the image forming apparatus 1 is provided with a cleaning device 70 that cleans a surface of the intermediate transfer belt 15.

Furthermore, the image forming apparatus 1 includes a collection device (not shown) that collects waste toner that is removed from the photoreceptor drums 11 by the drum cleaners 17Y, 17M, 17C, and 17K of the image forming units 10Y, 10M, 10C, and 10K and waste toner that is removed from the intermediate transfer belt 15 by the cleaning device 70.

In addition, the image forming apparatus 1 is provided with an air blowing mechanism 100 through which heat discharged from the fixing device 60 or a gas cooling the paper P heated at the fixing device 60 flows. The air blowing mechanism 100 of the present exemplary embodiment includes a first duct 110 and a second duct 120 that are adjacent to each other in a transport direction of the paper P in the fixing device 60. In addition, the air blowing mechanism 100 includes an exhaust portion 130 (refer to FIG. 4 which will be described later) through which a gas passing through the first duct 110 and the second duct 120 is discharged to the outside of the image forming apparatus 1 and a fan 135 (refer to FIG. 4 which will be described later) that is provided in the exhaust portion 130 and generates a gas stream in the first duct 110 and the second duct 120. Furthermore, the air blowing mechanism 100 includes a blocking portion 140 (refer to FIG. 3 which will be described later) that blocks a space between the fixing device 60 and the secondary transfer unit 20. The configuration of the air blowing mechanism 100 will be described in detail later.

In the following description, the transport direction of the paper P in the fixing device 60 may be simply referred to as the transport direction of the paper P or the transport direction.

In addition, the image forming apparatus 1 is provided with an exhaust mechanism 200 that is disposed to be adjacent to the fixing device 60 while being disposed downstream of the fixing device 60 in the transport direction of the paper P, that sucks in air in the vicinity of the fixing device 60, and that discharges the air to the outside of the image forming apparatus 1.

In addition, the image forming apparatus 1 is provided with a transport roller pair 41 that is composed of a pair of transport rollers 42 and 43 rotatably provided and that transports the paper P discharged from the fixing device 60 to a downstream side and a guide portion 40 that guides the paper P transported by the transport roller pair 41.

In addition, the image forming apparatus 1 is provided with a paper discharge unit 35 that discharges, to the outside of the image forming apparatus 1, the paper P that has passed through the guide portion 40.

In addition, the image forming apparatus 1 is provided with a paper transport path R1 in which paper from paper accommodation portions 31, 32, and 33 is transported toward the paper discharge unit 35 through the secondary transfer unit 20, the transport unit 50, the fixing device 60, the transport roller pair 41, and the guide portion 40. In addition, the image forming apparatus 1 is provided with a paper inversion path R2 in which the paper P on which an image has been formed and that has passed through the transport roller pair 41 is inverted upside down and is transported toward the secondary transfer unit 20 again.

Figure 8:
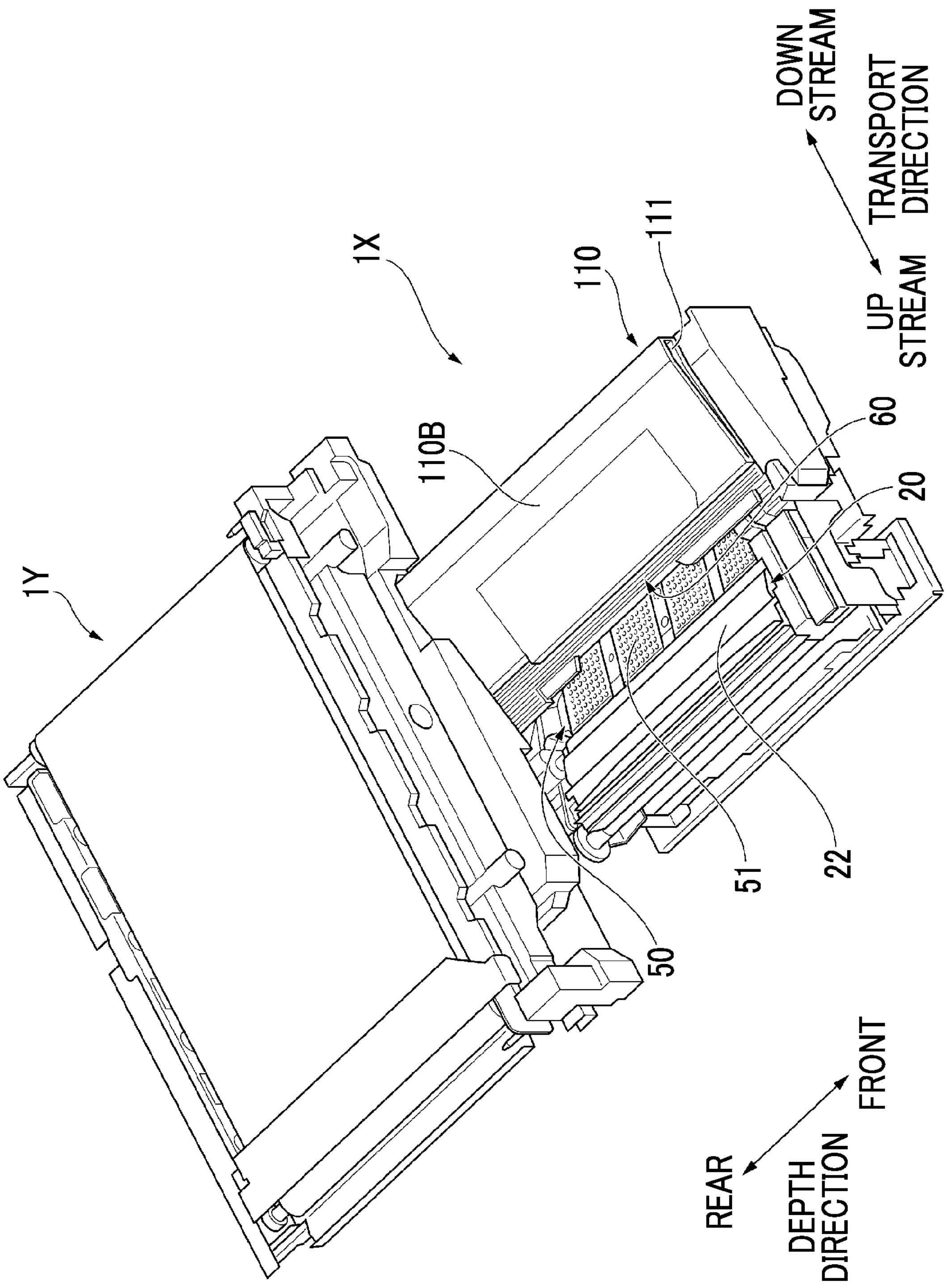
FIG. 8 is a perspective view showing a state where an attachable and detachable unit is drawn out from an apparatus main body of the image forming apparatus to which the present exemplary embodiment is applied.

In the image forming apparatus 1 of the present exemplary embodiment, the secondary transfer roller 21, the belt member 22, and the support roller 23 of the secondary transfer unit 20, the transport unit 50, the fixing device 60, and the first duct 110 and the blocking portion 140 of the air blowing mechanism 100 are integrally configured as an attachable and detachable unit 1X (refer to FIG. 8 which will be described later). The attachable and detachable unit 1X can be attached to and detached from an apparatus main body 1Y of the image forming apparatus 1.

In addition, the attachable and detachable unit 1X is provided to be movable with respect to the apparatus main body 1Y of the image forming apparatus 1 via a guide rail (not shown) or the like, and can be drawn out of the image forming apparatus 1. In this example, the attachable and detachable unit 1X is provided to be movable in a depth direction of the image forming apparatus 1, and is configured to be drawn toward a front side (front side of FIG. 2) of the image forming apparatus 1.

In the image forming apparatus 1 of the present exemplary embodiment, for example, in a case where a jam in which the paper P is jammed at the transport unit 50, the fixing device 60, or the like occurs or in the case of maintenance of the image forming apparatus 1 or the like, the attachable and detachable unit 1X is drawn out from the apparatus main body 1Y of the image forming apparatus 1. In the present exemplary embodiment, the attachable and detachable unit 1X is an example of a fixation unit.

The drawing out of the attachable and detachable unit 1X with respect to the apparatus main body 1Y of the image forming apparatus 1 will be described in more detail later.

In addition, each component of the image forming apparatus 1 described above is accommodated in a housing 1Z of the apparatus main body 1Y.

In the image forming apparatus 1 of the present exemplary embodiment, the image forming units 10Y, 10M, 10C, and 10K, the intermediate transfer belt 15, the backup roller 25 of the secondary transfer unit 20, and the second duct 120 of the air blowing mechanism 100 are supported by a common support of the housing 1Z. Accordingly, the positional accuracy of the second duct 120 with respect to the intermediate transfer belt 15 and the backup roller 25 of the secondary transfer unit 20 is improved.

A basic image forming process of the image forming apparatus 1 will be described.

In the image forming apparatus 1, image data is output from an image reading apparatus or the like (not shown). Then, the image data is subjected to image processing performed by an image processing device (not shown), is converted into color material gradation data of four colors which are Y, M, C, and K, and is output to the laser exposure device 13.

In the laser exposure device 13, for example, the respective photoreceptor drums 11 of the image forming units 10Y, 10M, 10C, and 10K are irradiated with an exposure beam Bm emitted from a semiconductor laser in accordance with the color material gradation data input thereto. At each photoreceptor drum 11, a surface is scanned and exposed to light by the laser exposure device 13 and an electrostatic latent image is formed after the surface is charged by the charger 12. Then, after a toner image is formed on the photoreceptor drum 11 by the developing device 14, the toner image is transferred onto the intermediate transfer belt 15 at the primary transfer unit 10 at which the photoreceptor drum 11 and the intermediate transfer belt 15 come into contact with each other.

After the toner image is primary-transferred onto a surface of the intermediate transfer belt 15, the toner image is transported to the secondary transfer unit 20 as the intermediate transfer belt 15 moves. At the secondary transfer unit 20, the secondary transfer roller 21 is pressed against the backup roller 25 via the belt member 22 and the intermediate transfer belt 15. In this case, the paper P that is transported from the paper accommodation portions 31, 32, and 33 by transport rollers 36 or the like is sandwiched between the intermediate transfer belt 15 and the belt member 22.

Then, unfixed toner images that are held on the intermediate transfer belt 15 are electrostatically transferred onto the paper P in a collective manner at the secondary transfer unit 20. Thereafter, the paper P on which the toner images have been electrostatically transferred is peeled off from the intermediate transfer belt 15 and then transported to the transport unit 50 that is provided downstream of the secondary transfer unit 20 in a paper transport direction. Then, the paper P transported to the transport unit 50 is transported to the fixing device 60 by the transport belt 51.

The toner images on the paper P transported to the fixing device 60 receive heat and a pressure from the fixing device 60 and are fixed onto the paper P. Then, the paper P on which a fixed image has been formed passes through the guide portion 40 by being transported by the transport roller pair 41 and is discharged to the outside of the image forming apparatus 1 through the paper discharge unit 35.

Meanwhile, toner adhering to the photoreceptor drums 11 after primary transfer is removed by the drum cleaners 17 and toner adhering to the intermediate transfer belt 15 after secondary transfer is removed by the cleaning device 70. The toner (waste toner) removed by the drum cleaners 17 and the cleaning device 70 is collected by a collection unit (not shown).

In this manner, a cycle of image forming processes in the image forming apparatus 1 is repeated corresponding to the number of prints.

Figure 3:
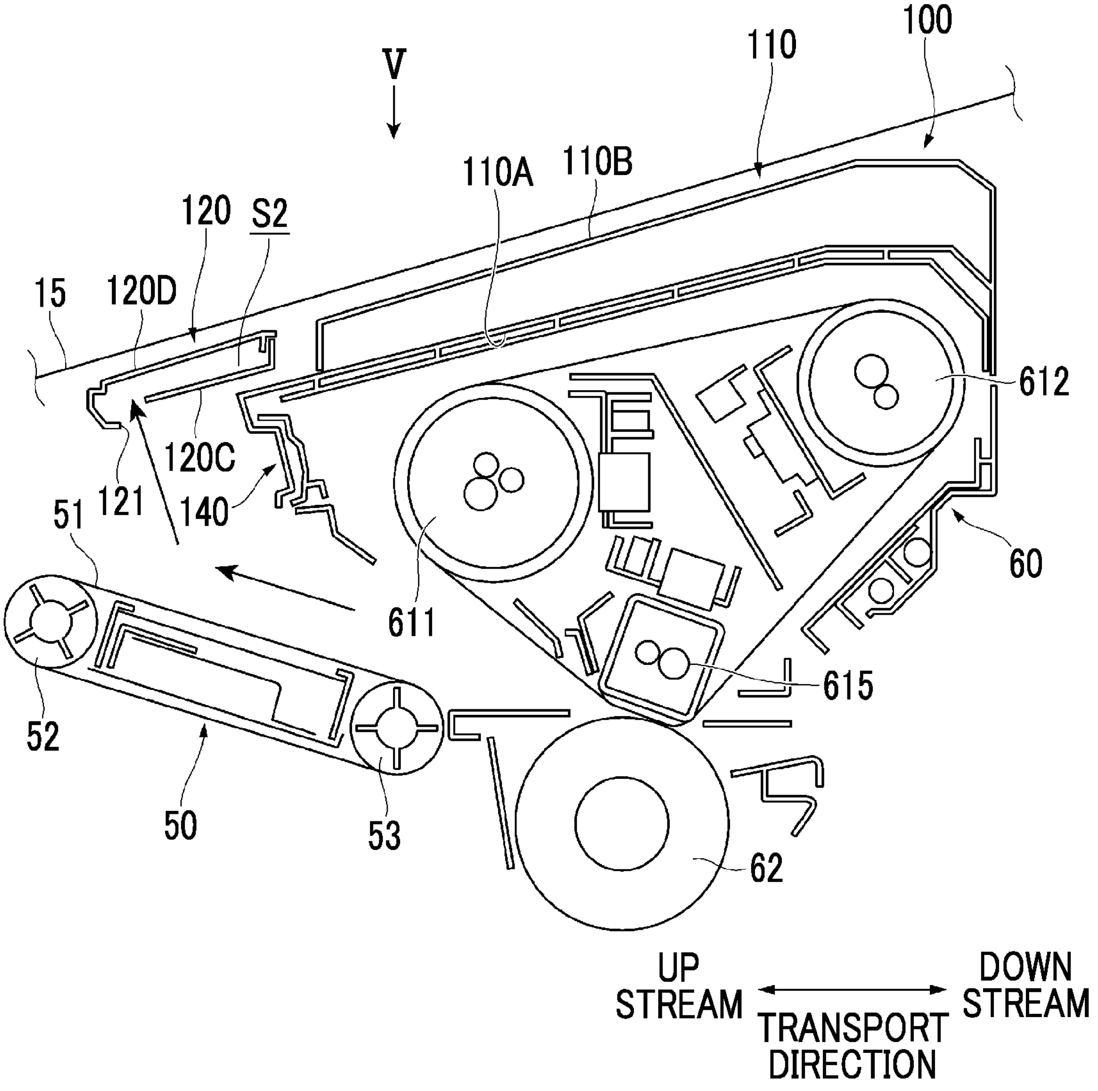
FIG. 3 is a view for describing the configuration of an air blowing mechanism and is an enlarged view of the vicinity of the air blowing mechanism in FIG. 2.
Figure 4:
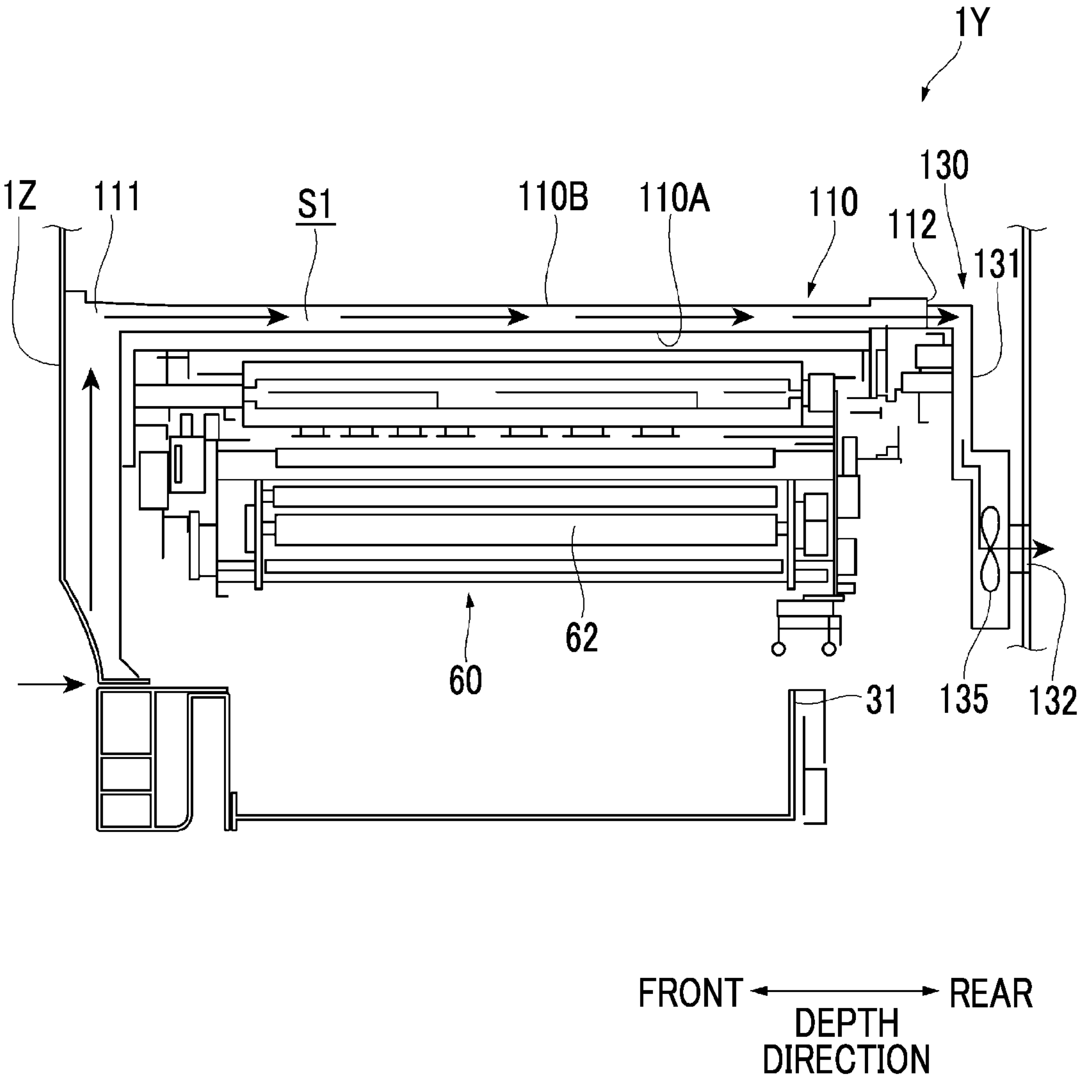
FIG. 4 is a cross-sectional view taken along line IV-IV in FIG. 2.
Figure 5:
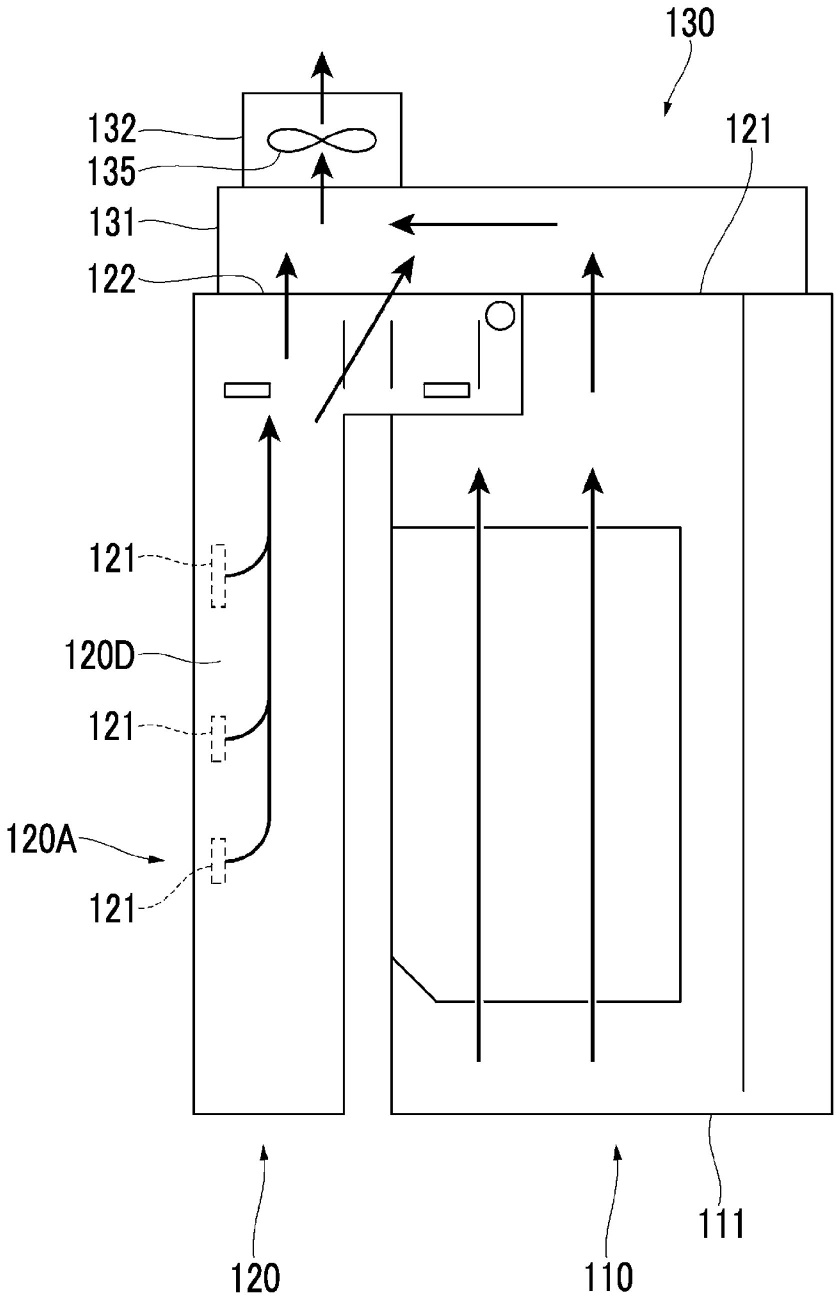
FIG. 5 is a view of a first duct and a second duct of the air blowing mechanism as seen in a direction V in FIG. 3.

Next, the air blowing mechanism 100 of the present exemplary embodiment will be described. FIG. 3 is a view for describing the configuration of the air blowing mechanism 100 and is an enlarged view of the vicinity of the air blowing mechanism 100 in FIG. 2. FIG. 4 is a cross-sectional view taken along line IV-IV in FIG. 2. FIG. 5 is a view of the first duct 110 and the second duct 120 of the air blowing mechanism 100 as seen in a direction V in FIG. 3.

As described above, the air blowing mechanism 100 includes the first duct 110 and the second duct 120 that are disposed to be adjacent to each other in the transport direction of the paper P, the exhaust portion 130 through which a gas passing through the first duct 110 and the second duct 120 is discharged, and the blocking portion 140 that blocks a space between the fixing device 60 and the secondary transfer unit 20.

The first duct 110 is an example of a first duct through which a gas that cools the fixing device 60 flows.

As described above, the first duct 110 is attached to the attachable and detachable unit 1X of the image forming apparatus 1. In this example, the first duct 110 is integrally provided with the fixing device 60 which is also attached to the attachable and detachable unit 1X. The first duct 110 is connected to the second duct 120 and the exhaust portion 130 in a state where the attachable and detachable unit 1X is not drawn out from the apparatus main body 1Y of the image forming apparatus 1 (state where attachable and detachable unit 1X is attached to apparatus main body 1Y).

The first duct 110 is provided between the intermediate transfer belt 15 and the fixing device 60.

In addition, the first duct 110 is disposed to face a portion of the fixation belt 610 of the fixing device 60 that is supported between the support roller 611 and the support roller 612 with an interval provided between the first duct 110 and the fixation belt 610. In the present exemplary embodiment, in a case where the first duct 110 and the fixing device 60 are seen from above, a length of the first duct 110 along the transport direction of the paper P is larger than a length of the fixation belt module 61 of the fixing device 60. In addition, the first duct 110 of the present exemplary embodiment also functions as a covering portion that covers an upper portion of the fixing device 60.

In addition, the first duct 110 has a flat shape extending along the transport direction of the paper P and a depth direction of the image forming apparatus 1 as a whole. A space S1 through which a gas flows is formed in the first duct 110.

The first duct 110 includes a first surface 110A and a second surface 110B that face each other in a vertical direction with the space S1 interposed therebetween. In this example, the first surface 110A is provided along the portion of the fixation belt 610 of the fixing device 60 that is supported between the support roller 611 and the support roller 612. In addition, the second surface 110B is provided along the intermediate transfer belt 15.

In addition, the first duct 110 includes an intake port 111 that is open toward the front side of the image forming apparatus 1 and into which a gas is sucked toward the space S1 and an exhaust port 112 that is open toward a rear side of the image forming apparatus 1 and through which the gas sucked into the intake port 111 is discharged to the exhaust portion 130 from the space S1.

The second duct 120 is an example of a second duct through which a gas that cools the fixing device 60 flows.

As described above, the second duct 120 is attached to the apparatus main body 1Y of the image forming apparatus 1. The second duct 120 is connected to the first duct 110 in a state where the attachable and detachable unit 1X is not drawn out from the apparatus main body 1Y of the image forming apparatus 1. In addition, the second duct 120 joins the first duct 110 at the apparatus main body 1Y in a state where the attachable and detachable unit 1X is not drawn out from the apparatus main body 1Y of the image forming apparatus 1.

The second duct 120 is disposed to be adjacent to the first duct 110 in the transport direction of the paper P transported to the fixing device 60. More specifically, the second duct 120 is disposed to be adjacent to the first duct 110 while being disposed upstream of the first duct 110 in the transport direction of the paper P.

In addition, the second duct 120 is provided between the secondary transfer unit 20 (refer to FIG. 2) and the fixing device 60 in the transport direction of the paper P.

Furthermore, the second duct 120 is provided along the intermediate transfer belt 15.

Furthermore, the second duct 120 is provided above the transport unit 50 and faces the transport belt 51 of the transport unit 50 via an interval.

In addition, the second duct 120 is provided above the fixing device 60 in a gravity direction.

The second duct 120 has a flat shape extending along the transport direction of the paper P and the depth direction of the image forming apparatus 1 as a whole. A space S2 through which a gas flows is formed in the second duct 120.

Figure 6:
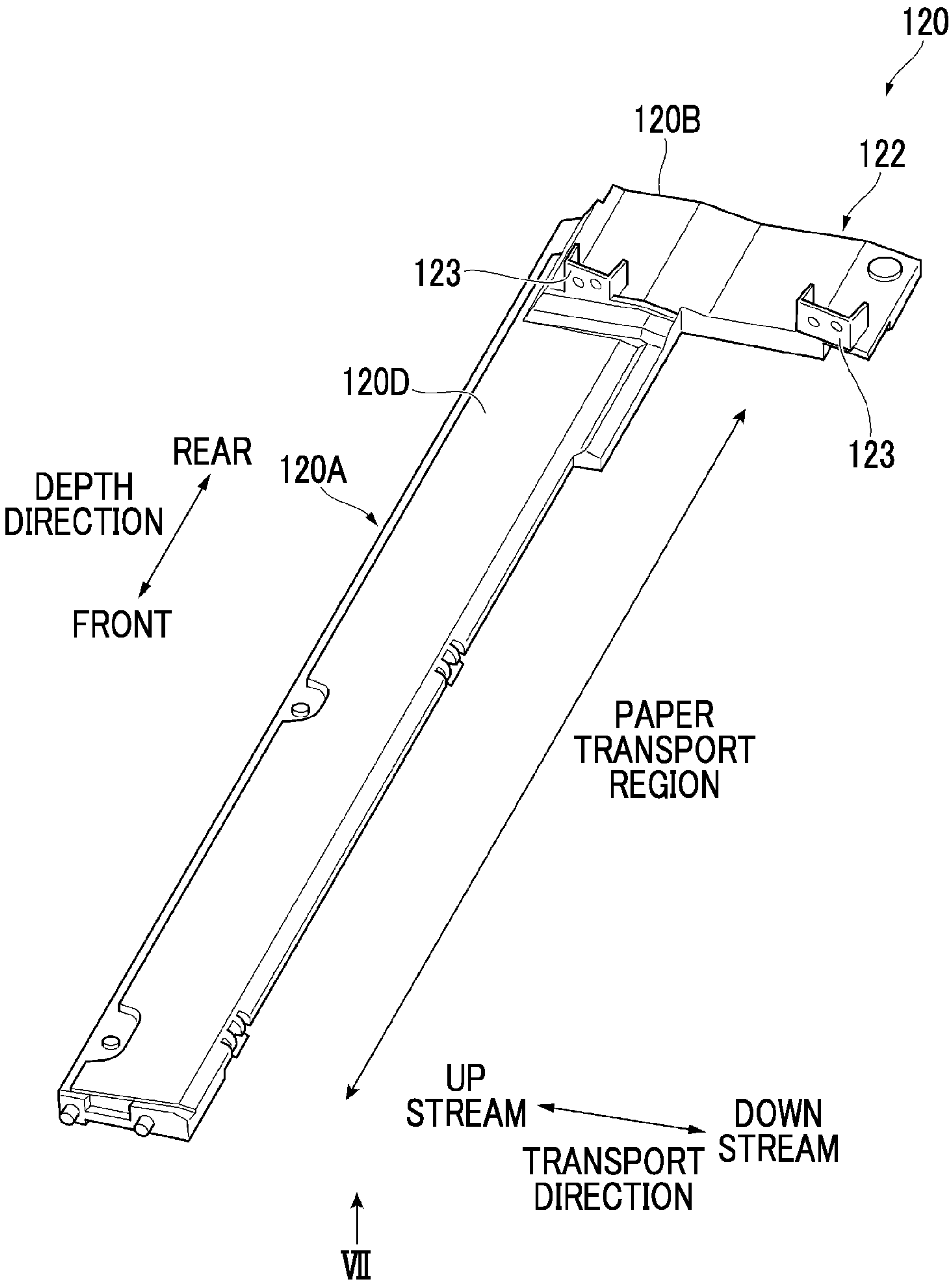
FIG. 6 is a perspective view of the second duct as seen from a front side in a depth direction, a downstream side in a transport direction, and an upper side in a gravity direction.
Figure 7:
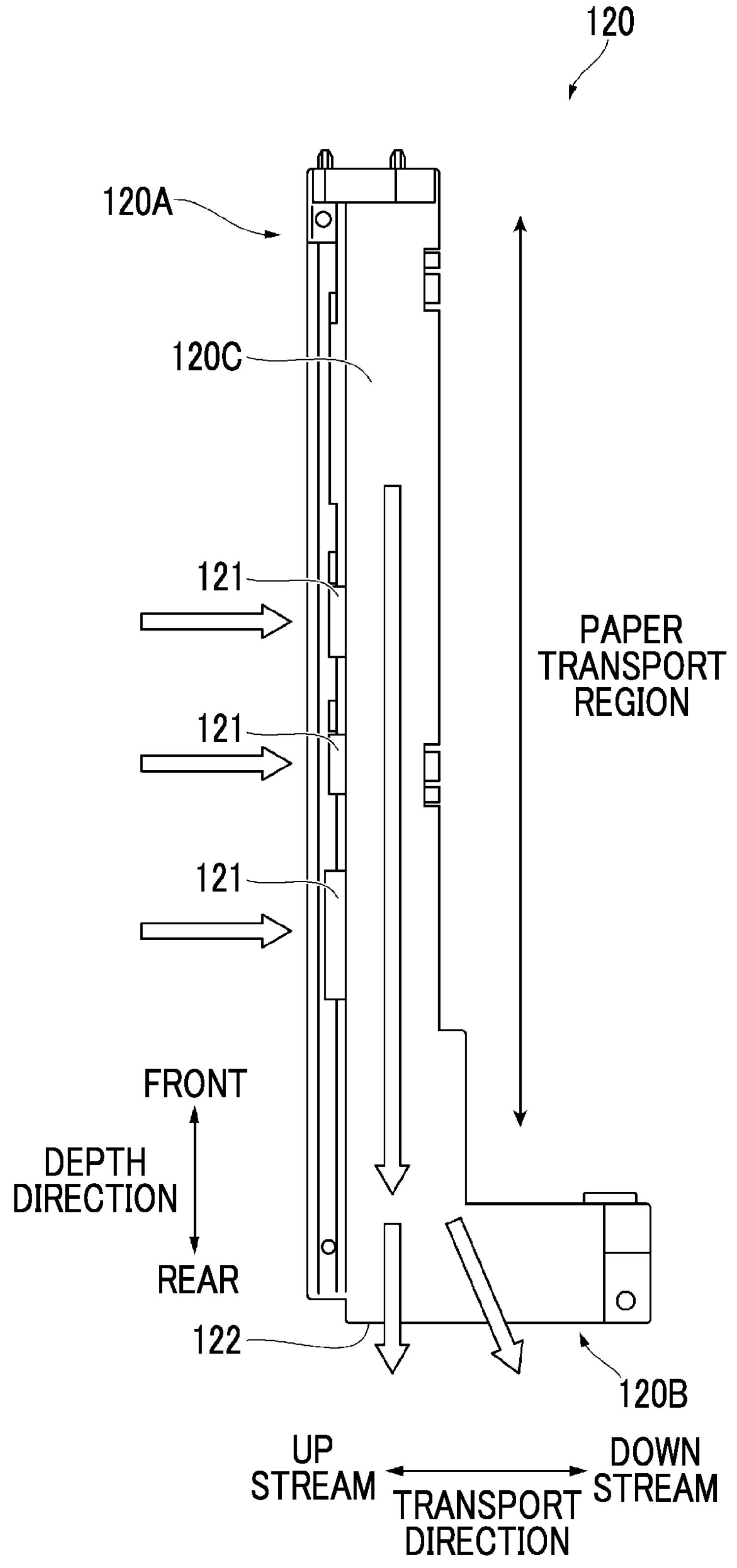
FIG. 7 is a view of the second duct shown in FIG. 6 as seen in a direction VII.

FIGS. 6 and 7 are views for describing the configuration of the second duct 120. FIG. 6 is a perspective view of the second duct 120 as seen from the front side in the depth direction, a downstream side in the transport direction, and an upper side in the gravity direction. FIG. 7 is a view of the second duct 120 shown in FIG. 6 as seen in a direction VII (from lower side in gravity direction).

The second duct 120 of the present exemplary embodiment includes an elongated portion 120A that extends along the depth direction of the image forming apparatus 1 and an extension portion 120B that extends toward the downstream side in the transport direction of the paper P from a rear end portion of the elongated portion 120A.

In the second duct 120 of the present exemplary embodiment, the length of the elongated portion 120A in the depth direction is larger than a length of a paper transport region where the paper P is transportable in the fixing device 60. In addition, the extension portion 120B of the second duct 120 is provided closer to the rear side than the paper transport region in the depth direction. The paper transport region is an example of a transport region in which a recording material can be transported.

In addition, the second duct 120 includes a first surface 120C and a second surface 120D that face each other in the vertical direction with the space S2 interposed therebetween. In this example, the first surface 120C faces the transport belt 51 of the transport unit 50 via an interval. In addition, the second surface 120D is provided along the intermediate transfer belt 15.

In addition, the second duct 120 includes a plurality of (three in this example) intake ports 121 that are provided in the first surface 120C of the elongated portion 120A and into which a gas is sucked toward the space S2. In this example, the intake ports 121 are arranged at intervals in the depth direction at an end portion of the first surface 120C that is on the upstream side in the transport direction.

In addition, each intake port 121 is open downward. In other words, each intake port 121 faces downward in the gravity direction. In the present exemplary embodiment, the expression "the intake port 121 faces downward in the gravity direction" means that the space S2 can be visually recognized through the intake port 121 in a case where the second duct 120 is seen from the lower side in the gravity direction.

Note that, in this example, a length in the depth direction of a region on the elongated portion 120A in which the intake ports 121 are not formed is larger than a length in the depth direction of a region on the elongated portion 120A in which the intake ports 121 are formed. Accordingly, a gas entering the space S2 through the intake ports 121 easily flows to the rear side in the depth direction.

In addition, the second duct 120 includes an exhaust port 122 that is provided at a rear end portion of the extension portion 120B in the depth direction, that is open toward the rear side in the depth direction, and through which a gas sucked into the intake ports 121 is discharged to the exhaust portion 130 from the space S2.

In addition, in the present exemplary embodiment, the second duct 120 and the first duct 110 join each other at the exhaust portion 130 via the exhaust port 122 or the exhaust port 112, the exhaust portion 130 being disposed closer to the rear side than the paper transport region in the depth direction.

In addition, the second duct 120 includes a plurality of (two in this example) attachment portions 123 that are provided on the second surface 120D of the elongated portion 120A and via which the second duct 120 is attached to the housing 1Z. In the present exemplary embodiment, the second duct 120 is supported by the apparatus main body 1Y by being attached to the housing 1Z via the attachment portions 123. The second duct 120 is attached to the housing 1Z by being screwed via the attachment portions 123, for example.

The exhaust portion 130 includes an exhaust path 131 through which a gas discharged from the first duct 110 and the second duct 120 flows. The exhaust path 131 is connected to the exhaust port 112 provided at a rear end portion of the first duct 110 and the exhaust port 122 provided at a rear end portion of the second duct 120 and is formed to extend downward in the gravity direction.

In addition, the exhaust portion 130 includes an exhaust port 132 that is provided at an end portion of the exhaust path 131 and through which a gas passing through the exhaust path 131 is discharged to the outside of the image forming apparatus 1.

In addition, the exhaust portion 130 includes the fan 135 that is provided in the exhaust path 131 and that is rotated by a drive source (not shown) to generate a gas stream in the first duct 110 and the second duct 120.

The blocking portion 140 blocks the space between the fixing device 60 and the secondary transfer unit 20. The blocking portion 140 is formed by a wall surface that extends downward in a weight direction from an end portion of the first surface 110A of the first duct 110 that is on the upstream side in the transport direction.

Since the air blowing mechanism 100 in the present exemplary embodiment includes the blocking portion 140, transmission of heat generated at the fixing device 60 to the secondary transfer unit 20 is suppressed and an increase in temperature of the secondary transfer unit 20 is suppressed.

Next, the operation of the air blowing mechanism 100 will be described.

In a case where the fixing device 60 or the like is to be cooled by means of the air blowing mechanism 100, the fan 135 of the exhaust portion 130 is driven and rotated by the drive source (not shown). Accordingly, a gas flows through the space S1 of the first duct 110 and the space S2 of the second duct 120 so that the fixing device 60 and the vicinity of the fixing device 60 are cooled.

Specifically, in the first duct 110, as shown in FIG. 4, a gas that enters the apparatus main body 1Y via a gap or the like formed in the housing 1Z from the outside of the apparatus main body 1Y of the image forming apparatus 1 and that moves to an upper side from a lower side along an inner surface of the housing 1Z is sucked into the space S1 via the intake port 111. Then, through an inside of the first duct 110, the gas entering the space S1 flows from the front side to the rear side in the depth direction. In this case, heat generated from the fixing device 60 is transmitted to the gas flowing through the first duct 110, and the fixing device 60 is cooled.

Then, the gas flowing through the first duct 110 enters the exhaust path 131 of the exhaust portion 130 through the exhaust port 112. Thereafter, the gas entering the exhaust path 131 is discharged to the outside of the image forming apparatus 1 through the exhaust port 132.

In addition, in the second duct 120, as shown in FIGS. 3 and 5, gas is sucked into the space S2 of the elongated portion 120A via the intake ports 121 from a space positioned upstream of the fixing device 60 in the transport direction. Then, through an inside of the elongated portion 120A of the second duct 120, the gas entering the space S2 flows from the front side to the rear side in the depth direction. Then, the gas reaching the rear end portion of the elongated portion 120A of the second duct 120 flows through the extension portion 120B from the front side to the rear side in the depth direction and enters the exhaust path 131 of the exhaust portion 130 via the exhaust port 122. After that, the gas that has entered the exhaust path 131 is discharged to the outside of the image forming apparatus 1 through the exhaust port 132 together with the gas that has flowed through the first duct 110.

In this manner, a high-temperature gas present in the vicinity of the fixing device 60 is discharged to the outside of the image forming apparatus 1 via the second duct 120, so that the fixing device 60 and the vicinity of the fixing device 60 are cooled.

As described above, the air blowing mechanism 100 of the present exemplary embodiment includes the first duct 110 and the second duct 120 through which a gas that cools the fixing device 60 flows. Accordingly, for example, the amount of gas that flows to cool the fixing device 60 is increased and the efficiency of the cooling of the fixing device 60 with the air blowing mechanism 100 is improved in comparison with a case where the air blowing mechanism 100 includes only one of the first duct 110 or the second duct 120.

Here, a gas is sucked into the intake ports 121 of the second duct 120 between the fixing device 60 and the secondary transfer unit 20 (refer to FIG. 2). Since such a configuration is adopted, a gas of which the temperature is increased to a high temperature by heat from the fixing device 60 is easily discharged to the outside of the image forming apparatus 1 via the second duct 120 and the efficiency of the cooling of the fixing device 60 with the air blowing mechanism 100 is improved. In addition, the temperature of the secondary transfer unit 20 is restrained from being made high because of heat from the fixing device 60 and a transfer failure or the like caused by toner melting at the secondary transfer unit 20 is suppressed.

In addition, a gas is sucked into the intake ports 121 of the second duct 120 at a position closer to the secondary transfer unit 20 than the blocking portion 140. Since such a configuration is adopted, a decrease in temperature of the fixation belt 610 moving toward the fixation nip portion is suppressed in comparison with a case where a gas is taken in through the intake ports 121 at a position closer to the fixing device 60 than the blocking portion 140 or a case where the air blowing mechanism 100 does not include the blocking portion 140, for example. Accordingly, it is possible to cool the fixing device 60 and the vicinity of the fixing device 60 while suppressing a decrease or a change in fixation temperature caused by gas suction into the second duct 120.

Furthermore, the intake ports 121 of the second duct 120 face downward in the gravity direction. Since such a configuration is adopted, a high-temperature gas easily enters the intake ports 121 because of natural convection from the lower side to the upper side in the gravity direction, which is caused by heat from the fixing device 60 and generated in the vicinity of the fixing device 60. Accordingly, a gas of which the temperature is increased to a high temperature by heat from the fixing device 60 is easily discharged to the outside of the image forming apparatus 1 via the second duct 120 and the efficiency of the cooling of the fixing device 60 with the air blowing mechanism 100 is improved in comparison with a case where the intake ports 121 do not face downward in the gravity direction.

In addition, in the case of the air blowing mechanism 100 of the present exemplary embodiment, a gas that enters the apparatus main body 1Y via a gap or the like formed in the housing 1Z from the outside of the apparatus main body 1Y is sucked into the first duct 110 through the intake port 111 formed at a front end portion of the first duct 110. In addition, a gas is sucked into the first duct 110 at a position closer to the outside of the apparatus main body 1Y in comparison with the second duct 120. Since such a configuration is adopted, a low-temperature gas present outside the apparatus main body 1Y is easily taken into the space S1 of the first duct 110.

As described above, the first duct 110 is provided to face the fixing device 60 of which the temperature is likely to be made high. In the present exemplary embodiment, the fixing device 60 may be cooled more effectively since a low-temperature gas present outside the apparatus main body 1Y is easily taken into the space S1 of the first duct 110.

In addition, in the case of the air blowing mechanism 100 of the present exemplary embodiment, the first duct 110 and the second duct 120 join each other at the exhaust portion 130 provided in the apparatus main body 1Y. In addition, in the air blowing mechanism 100, a gas flows through the first duct 110 and the second duct 120 as the common fan 135 rotates. Furthermore, in the air blowing mechanism 100, a gas flowing through the first duct 110 and a gas flowing through the second duct 120 are discharged to the outside of the image forming apparatus 1 via the common exhaust path 131 and the common exhaust port 132. Since such a configuration is adopted, for example, the configuration of the air blowing mechanism 100 can be simplified in comparison with a case where a fan that causes a gas to flow and an exhaust path and an exhaust port for discharge of the gas are provided in each of the first duct 110 and the second duct 120.

In addition, in the case of the air blowing mechanism 100 of the present exemplary embodiment, the first duct 110 and the second duct 120 join each other at a position closer to the rear side than the paper transport region in the fixing device 60, in other words, at a position outside the paper transport region. Since such a configuration is adopted, for example, a change in amount or temperature of a gas flowing through the first duct 110 and the second duct 120 that occurs inside the paper transport region is suppressed in comparison with a case where the first duct 110 and the second duct 120 join each other inside the paper transport region. Accordingly, temperature unevenness of the fixing device 60 is less likely to occur in the paper transport region, and a fixation failure caused by the fixing device 60 is suppressed.

Figure 9:
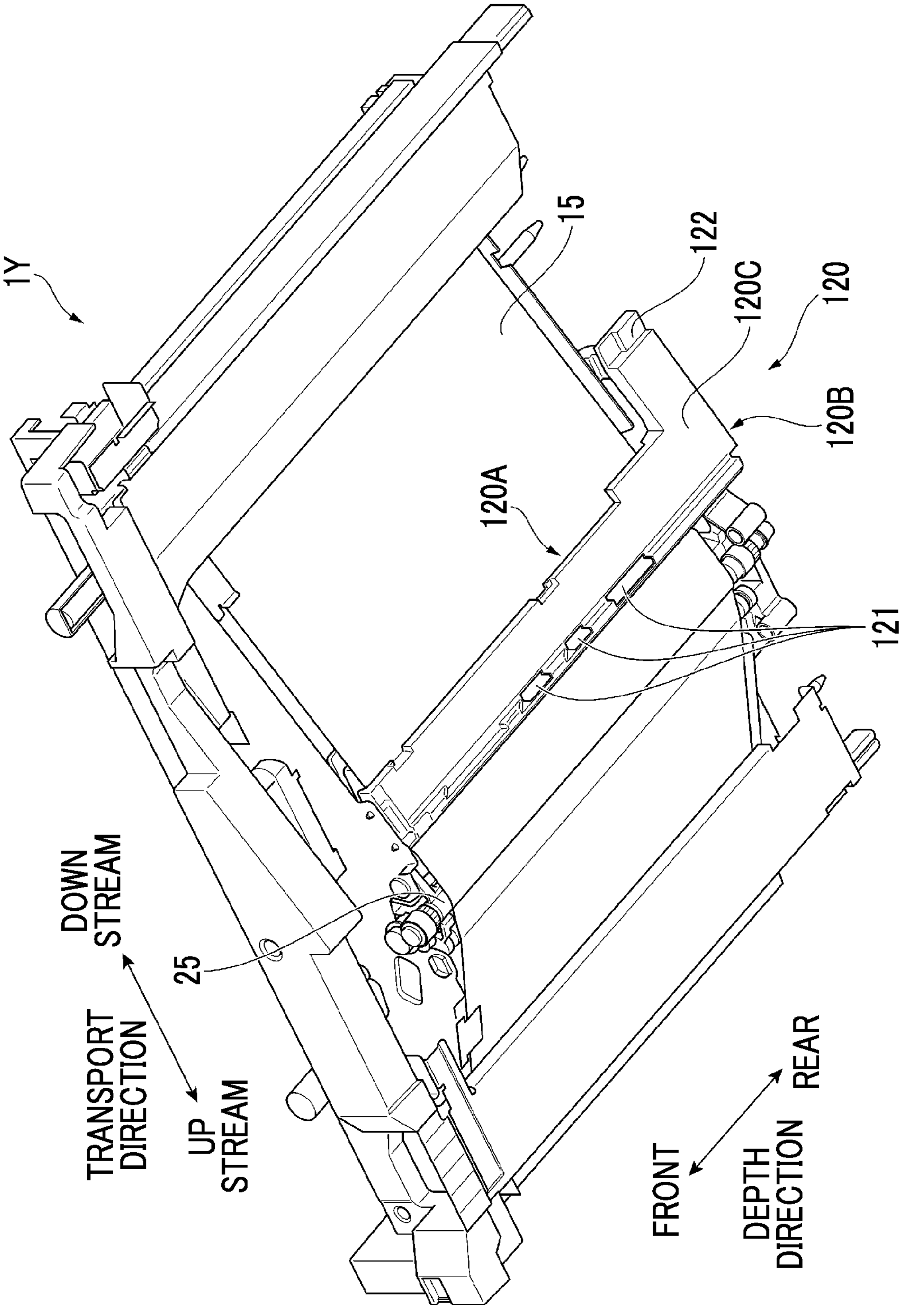
FIG. 9 is a view of the apparatus main body in FIG. 8 as seen from below.

Next, the drawing out of the attachable and detachable unit 1X with respect to the apparatus main body 1Y of the image forming apparatus 1 will be described. FIG. 8 is a perspective view showing a state where the attachable and detachable unit 1X is drawn out from the apparatus main body 1Y of the image forming apparatus 1 to which the present exemplary embodiment is applied. FIG. 9 is a view of the apparatus main body 1Y in FIG. 8 as seen from below.

In the image forming apparatus 1 of the present exemplary embodiment, for example, in a case where a jam in which the paper P is jammed at the transport unit 50, the fixing device 60, or the like occurs or in the case of maintenance of the image forming apparatus 1 or the like, the attachable and detachable unit 1X is drawn out from the apparatus main body 1Y of the image forming apparatus 1 toward the front side. Then, as the attachable and detachable unit 1X is drawn out from the apparatus main body 1Y, each member attached to the attachable and detachable unit 1X is drawn out to the outside of the image forming apparatus 1.

Meanwhile, a case where the first duct 110 and the second duct 120 are provided in the viewpoint of improving the cooling efficiency for the fixing device 60 or the like in the image forming apparatus 1 and both of the first duct 110 and the second duct 120 are attached to the attachable and detachable unit 1X will be described. In this case, it may be difficult for a user to visually recognize the transport unit 50 and the fixing device 60 provided at the attachable and detachable unit 1X since the transport unit 50 and the fixing device 60 are covered by the first duct 110 and the second duct 120 in a case where the attachable and detachable unit 1X is drawn out from the apparatus main body 1Y. In this case, for example, there may be a decrease in workability for the user in the case of a jam in which the paper P is jammed at the transport unit 50 or the fixing device 60, maintenance of the image forming apparatus 1, or the like.

However, in the case of the air blowing mechanism 100 of the present exemplary embodiment, the first duct 110 is attached to the attachable and detachable unit 1X, while the second duct 120 is attached to the apparatus main body 1Y.

In addition, in a case where the attachable and detachable unit 1X is drawn out from the apparatus main body 1Y to the front side, the first duct 110 is drawn out from the apparatus main body 1Y to the outside of the image forming apparatus 1 together with the attachable and detachable unit 1X. Meanwhile, the second duct 120 remains in the apparatus main body 1Y without being drawn out to the outside of the image forming apparatus 1.

Accordingly, for example, in comparison with a case where the second duct 120 is attached to the attachable and detachable unit 1X the transport unit 50 or the fixing device 60 provided at the attachable and detachable unit 1X is likely to be exposed to the outside in a case where the attachable and detachable unit 1X is drawn out. In this case, for example, there is an improvement in workability for the user in the case of a jam in which the paper P is jammed at the transport unit 50 or the fixing device 60, maintenance of the image forming apparatus 1, or the like.

Particularly, in the present exemplary embodiment, in a state where the attachable and detachable unit 1X is not drawn out from the apparatus main body 1Y, the second duct 120 is attached to the apparatus main body 1Y to face the transport unit 50. Since such a configuration is adopted, in a case where the attachable and detachable unit 1X is drawn out, the second duct 120 remains inside the apparatus main body 1Y without being drawn out from the apparatus main body 1Y and thus the transport unit 50 is likely to be exposed to the outside. Accordingly, the visibility of the transport unit 50 for a user is improved and an operation of fixing a jam in a case where the paper P or the like is jammed at the transport unit 50 is facilitated, for example.

Meanwhile, in a case where the air blowing mechanism 100 includes the first duct 110 and the second duct 120, it is conceivable to attach both of the first duct 110 and the second duct 120 to the apparatus main body 1Y from the viewpoint of suppressing a decrease in visibility of the transport unit 50 or the fixing device 60 which is caused in a case where the attachable and detachable unit 1X is drawn out from the apparatus main body 1Y, for example. However, in a case where such a configuration is adopted, the fixing device 60 of which the temperature is high is likely to be exposed to the outside in a case where the attachable and detachable unit 1X is drawn out from the apparatus main body 1Y and a user may come into direct contact with the fixing device 60 of which the temperature is high.

On the other hand, in the present exemplary embodiment, the first duct 110 is attached to the attachable and detachable unit 1X to face an upper side of the fixing device 60. In addition, in a case where the attachable and detachable unit 1X is drawn out, the first duct 110 is drawn out to the outside of the apparatus main body 1Y together with the fixing device 60. Since such a configuration is adopted, in a case where the attachable and detachable unit 1X is drawn out, the upper side of the fixing device 60 of which the temperature is high is restrained from being exposed to the outside and a user is restrained from coming into direct contact with the fixing device 60 of which the temperature is high.

Note that, in the present exemplary embodiment, a case where the first duct 110 attached to the attachable and detachable unit 1X and the second duct 120 attached to the apparatus main body 1Y are disposed to be adjacent to each other in the transport direction of the paper P has been used as an example. However, the present invention is not limited thereto. The first duct 110 and the second duct 120 may be disposed to be adjacent to each other in the depth direction of the image forming apparatus 1. For example, the first duct 110 attached to the attachable and detachable unit 1X may be disposed on the front side in the depth direction with respect to the second duct 120 attached to the apparatus main body 1Y.

Although the exemplary embodiment of the present invention has been described above, the configurations described above are not limited to the above-described exemplary embodiment and modification examples thereof, and can be modified without departing from the spirit. In other words, it can be understood that various changes in shape or details are possible without departing from the spirit and scope of the claims.

For example, a part of each configuration described above may be omitted, or other functions may be added to each configuration described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
an apparatus main body that includes an image formation unit forming an image on a recording material;
a fixation unit that includes a fixing unit fixing the image formed by the image formation unit onto the recording material and that is attachable to and detachable from the apparatus main body;
a first duct that is attached to the fixation unit to face the fixing unit and through which a gas that cools the fixing unit flows; and
a second duct that is attached to the apparatus main body to be adjacent to the first duct and through which a gas that cools the fixing unit flows,
wherein the gas is sucked into the first duct at a position closer to an outside of the apparatus main body in comparison with the second duct.

2. The image forming apparatus according to claim 1,
wherein the second duct is attached to the apparatus main body to be adjacent to the first duct in a transport direction of the recording material transported to the fixing unit.

3. The image forming apparatus according to claim 2,
wherein the second duct is attached to the apparatus main body to be adjacent to the first duct while being disposed upstream of the first duct in the transport direction and includes an intake port into which the gas is sucked between the fixing unit and the image formation unit.

4. The image forming apparatus according to claim 3,
wherein the second duct is provided above the fixing unit in a gravity direction, and
the intake port faces downward in the gravity direction.

5. The image forming apparatus according to claim 3,
wherein the fixation unit further includes a blocking portion that blocks a space between the fixing unit and the image formation unit, and
the gas is sucked into the intake port of the second duct at a position closer to the image formation unit than the blocking portion.

6. The image forming apparatus according to claim 4,
wherein the fixation unit further includes a blocking portion that blocks a space between the fixing unit and the image formation unit, and
the gas is sucked into the intake port of the second duct at a position closer to the image formation unit than the blocking portion.

7. The image forming apparatus according to claim 1,
wherein the second duct is provided between the image formation unit and the fixing unit.

8. The image forming apparatus according to claim 1,
wherein the fixation unit further includes a transport unit that transports the recording material to the fixing unit, and
the second duct is attached to the apparatus main body to face the transport unit of the fixation unit.

9. The image forming apparatus according to claim 1,
wherein the apparatus main body further includes a support that supports the image formation unit, and
the second duct is supported by the support of the apparatus main body.

10. An image forming apparatus comprising:
an apparatus main body that includes an image formation unit forming an image on a recording material;

a fixation unit that includes a fixing unit fixing the image formed by the image formation unit onto the recording material and that is attachable to and detachable from the apparatus main body;

a first duct that is attached to the fixation unit to face the fixing unit and through which a gas that cools the fixing unit flows; and a second duct that is attached to the apparatus main body to be adjacent to the first duct and through which a gas that cools the fixing unit flows, wherein the first duct and the second duct join each other at an exhaust portion provided in the apparatus main body.

11. The image forming apparatus according to claim 10, wherein the first duct and the second duct join each other outside a transport region where the recording material is transportable to the fixing unit.

* * * * *